6/21/83 OR 4,389,559

United States Patent [19]

Rotolico et al.

[11] 4,389,559

[45] Jun. 21, 1983

[54] PLASMA-TRANSFERRED-ARC TORCH CONSTRUCTION

[75] Inventors: Anthony J. Rotolico, Hauppauge; Eduardo Romero, Coram, both of N.Y.

[73] Assignee: Eutectic Corporation, Flushing, N.Y.

[21] Appl. No.: 229,275

[22] Filed: Jan. 28, 1981

[51] Int. Cl.[3] .......................... B23K 28/00; B23K 9/00

[52] U.S. Cl. ................................ 219/121 PP; 219/75; 219/76.16; 219/121 PQ; 313/231.4

[58] Field of Search ............ 219/75, 74, 76.16, 121 P, 219/121 PP, 121 PR, 121 PM, 121 PQ; 313/231.3, 231.4, 231.5, 231.6

[56] References Cited

U.S. PATENT DOCUMENTS

| | | | |
|---|---|---|---|
| 3,450,926 | 6/1969 | Kiernan | 219/121 PP |
| 3,641,308 | 2/1972 | Couch, Jr. et al. | 219/121 PP |
| 4,055,741 | 10/1977 | Bykhousky et al. | 219/121 PM |
| 4,140,892 | 2/1979 | Muller | 219/121 PP |
| 4,311,897 | 1/1982 | Yerushalmy | 219/121 PM |

OTHER PUBLICATIONS

American Welding Society, *Welding Handbook*, Seventh Edition, vol. 1, "Fundamentals of Welding", 1976, pp. 11-12.

*Primary Examiner*—B. A. Reynolds
*Assistant Examiner*—Alfred S. Keve
*Attorney, Agent, or Firm*—Hopgood, Calimafde, Kalil, Blaustein & Judlowe

[57] ABSTRACT

The invention contemplates a plasma-transferred-arc torch construction wherein, optionally, a single releasable clamp enables rapid separation of downstream-end fittings of an anode subassembly and a cathode subassembly, as for inspection, servicing and/or replacement; in an alternative option, release of the single clamp enables rapid further disassembly of the entirety of the respective subassemblies from mounting structure which includes the single clamp. These options are available for torch structure incorporating provision for sealed independent fluid-flow supplies of (a) coolant serving both electrode subassemblies, (b) plasma gas serving an annular interelectrode gap at the downstream end of the torch, (c) a metallic, ceramic or other powder fluidized in a carrier gas, for torch-deposition of the powder, and (d) a shielding gas to protect the zone of plasma-transfer of the arc and any powder conveyed therewith.

21 Claims, 5 Drawing Figures

FIG. I.
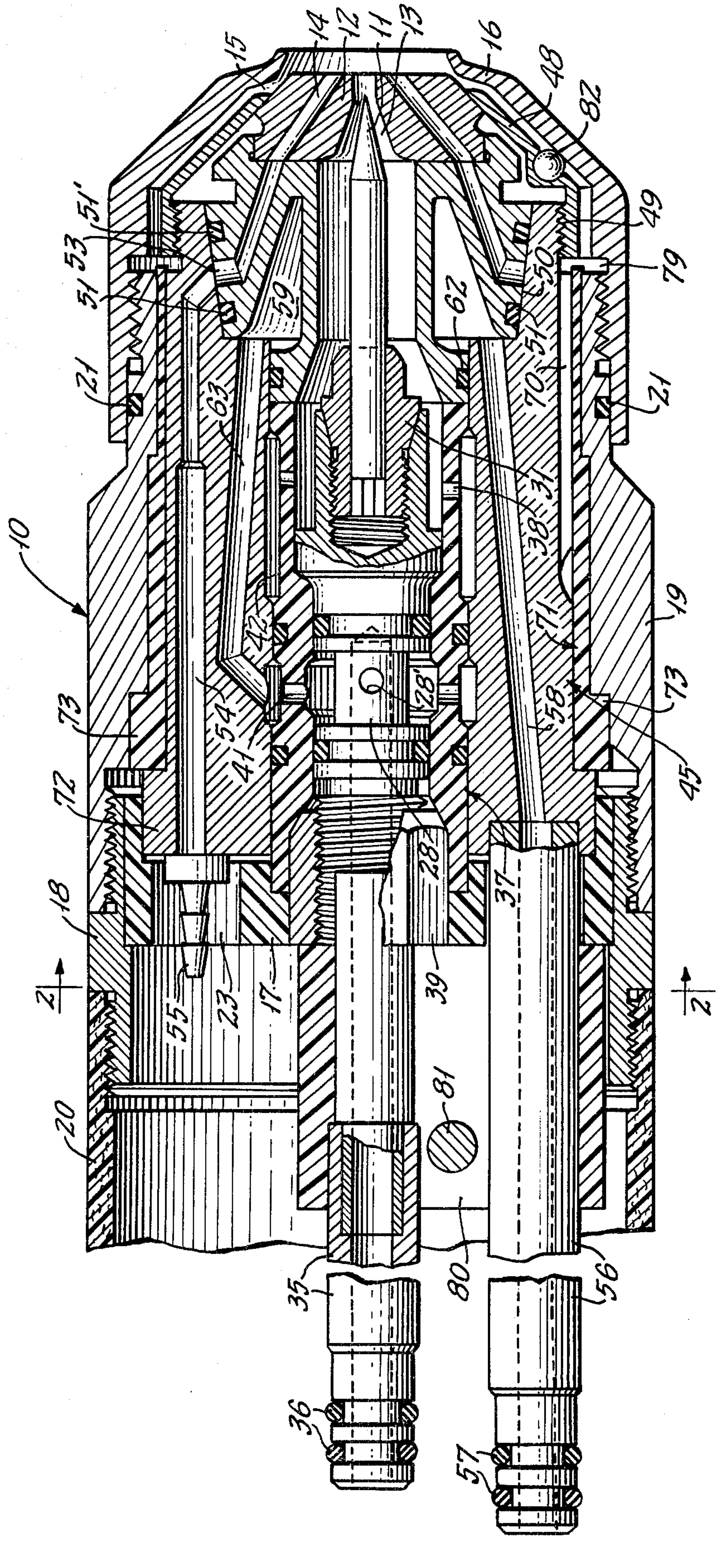

PLASMA-TRANSFERRED-ARC TORCH CONSTRUCTION

BACKGROUND OF THE INVENTION

The invention relates to an electric-arc torch construction wherein a downstream flow of plasma gas through an annular gap between cathode and anode electrode elements is operative to transfer the arc in the downstream direction and external of the torch structure.

Existing torches of the character indicated are called upon to perform a variety of tasks, and if the torch is to have powder-spraying capability, as for metal or ceramic deposition upon a substrate or workpiece external to the torch, as many as four independent fluid flows may be required to serve a particular job. These independent flows may involve (a) a coolant liquid to be circulated through an external heat-exchanger, (b) a plasma-gas supply, (c) a powder supply involving fluidized powder in a carrier-gas flow, and (d) a shielding-gas flow to effectively isolate the region of arc discharge and powder transport between the torch and a workpiece. Existing torches to accommodate such independent flows are of complex mechanical construction, rendering unduly difficult the maintenance and/or repair of the torch.

BRIEF STATEMENT OF THE INVENTION

It is an object of the invention to provide an improved torch construction of the character indicated.

It is a specific object to provide a torch construction wherein all the above-noted independent flows may be readily and effectively accommodated and, yet, wherein a single readily releasable clamp enables immediate access to downstream-end parts in need of replacement or service in the course of a given production job.

Another specific object is to meet the above object with structure which involves no disturbance of fluid-flow connections in order to service the torch.

A further specific object is to meet the above objects with structure involving replaceable components which are inherently and simply severable, once the single clamp has been released.

A still further specific object is to provide such a torch with releasable clamp structure wherein the annular gap for shielding-gas discharge may be selectively varied to suit particular job requirements.

A general object is to meet the above objects with structure of basic simplicity and relatively low cost, while preserving electrical neutrality (i.e., isolation) vis-a-vis electrical voltages applied to the electrodes of the torch.

The invention achieves the foregoing objects and provides certain further features by employing an annular anode subassembly and a central cathode subassembly, each of which is so releasably supported in relation to the other and to the base of a mounting subassembly, that a single releasable clamp which forms part of the mounting subassembly is operative to retain all parts in their necessary relation, to serve not only the electrical excitation of electrodes but also the four independent flows noted above. In-and-out flow of circulating coolant, as well as independent flows of plasma gas, powdered carrier gas, and shielding gas are all served through openings in the base of the mounting subassembly, and the releasable clamp has (1) an adjustably threaded tubular connection to the base and (2) a convergent annular downstream end, whereby it can apply compressive retaining force to the anode subassembly and to the cathode subassembly, against the mounting base as a reference. The retaining force is serially operative upon multiple components of the electrode subassemblies, to assure retention of components within an electrode subassembly, and to assure retention of the electrode subassemblies to each other and to the mounting subassembly. In the specific form described, three angularly spaced local spacer elements of electrically insulating material enable the clamp force to be applied, as well as selective determination of the effective section of the annular gap for discharge of shielding gas.

DETAILED DESCRIPTION

The invention will be illustratively described in detail in conjunction with the accompanying drawings, in which:

FIG. 1 is a partly schematic longitudinal sectional view through a torch construction, in fully assembled condition;

Figure 3:
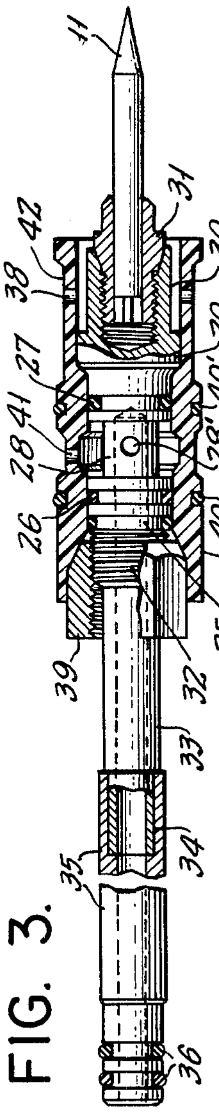
FIGS. 3, 4 and 5 are similar longitudinal sectional views to reveal the respective principal subassemblies involved in the torch of FIG. 1.

In FIG. 1, the invention is seen to be embodied in a torch 10 wherein an annular electric-arc discharge between the conical tip of a cathode element 11 and the convergent bore of an anode element 12 is displaced downstream and external to the torch, by reason of a flow of plasma gas (such as argon) in the annular space 13 between these elements. Provision is made, at plural inclined discharge passages 14 (in anode element 12), for an additional flow of carrier gas containing fluidized powder to be conveyed by the plasma-transferred arc to a workpiece or substrate (not shown). Further provision is made, at a convergent passage 15 between the anode element 12 and a cupped annular nose-clamp element 16, for a convergent flow of shielding gas to protect the region of arc and powder discharge to the workpiece.

Importantly, the foregoing flows, in addition to the insulated supply of electrical excitation to the electrode elements, as well as the externally circulating flow of liquid coolant to structure supporting each of the electrode elements 11-12, are accomplished with ready inspection and servicing accessibility, using essentially three subassemblies. A first or cathode subassembly (FIG. 3) supports and includes the cathode element 11; a second or anode subassembly (FIG. 4) supports and includes the anode element 12; and a third or mounting subassembly (FIG. 5) includes the nose-clamp element 16, as a readily separable part thereof.

The mounting subassembly (FIG. 5) comprises five severably connected parts which become assembled in the process of assembling the cathode and anode subassemblies thereto, but, once assembled, the ready access noted above is available upon removal of the nose-clamp element 16; in addition to nose-clamp element 16, these severably connected parts include a base 17 of insulating material, a nipple 18 having a counterbore in which base 17 is seated, an elongate coupling 19 having removably threaded upstream-end connection to nipple 18 and removably threaded downstream-end connection to the nose-clamp element 16, and an upstream-end protective sleeve 20 having removably threaded connection to nipple 18. Of these various removably threaded connections, the coupling-and-clamp connection (19-16) is preferably also sealed, as by an elastomeric O-ring 21. The base 17 has a central bore 22 and four angularly spaced bores 23, which may be at equal radial offset from the central axis.

Referring principally to FIGS. 1 and 3, the cathode subassembly is seen to comprise a machined elongate central body 25 on the axis of the torch and having axially spaced groove and flange formations for the location of O-ring seals 26-27, on opposite axial sides of a reduced annular section 28; the reduced section 28 serves a coolant-manifolding function, as will later become clear. Downstream from the reduced section 28 and its protecting seals 26-27, the cathode body 25 is externally characterized by a radially outward flange 29 and by a cylindrical rabbet or land 30, which extends to the downstream end of body 25; this downstream end is bored and counterbored for threaded reception and coaction with collet means 31, for removably clamped retention of the cathode element 11. Upstream from the reduced section 28 and its protecting seals 26-27, the body 25 is externally characterized by threads 32 and by a reduced cylindrical tail 33, shown with soldered telescopic fit at 34 to a tubular extension piece 35. A bore in tail 33 extends to axial register with the reduced section 28 and radial porting 28' therein, to establish a coolant-flow passage from the reduced manifolding section 28 to the bore of the tubular piece 35, and a pair of groove-retained O-rings 26 at the upstream end of the tubular piece 35 will be understood to provide removably sealed connectability to external means (including a heat exchanger, not shown) for what will later be seen to be a continuous recirculating flow of coolant liquid.

The cathode subassembly is completed by an elongate electrically insulating sleeve 37 having a bore to which O-rings 26-27 are removably sealed. At its downstream end, sleeve 37 is counterbored for seated accommodation of the body flange 29, and the annular space between land 30 and the downstream end of sleeve 37 defines a manifold which will later be seen to serve the flow of plasma gas, via radial ports 38 in sleeve 37. Sleeve 37 is retained in its preassembly to body 25, via a nut 39 removably engaged to threads 32. Sleeve 37 is externally characterized by elastomeric O-rings 40—40' in axially spaced retaining grooves; between rings 40—40', sleeve 37 is reduced to define a circumferentially continuous groove with radially ported communication 41 to the coolant manifold at 28. Sleeve 37 is similarly reduced at 42 to serve a manifolding function for the flow of plasma gas to ports 38, as will later become clear. As will be clearly seen in FIG. 3, the nose end of collet means 31 projects sufficiently beyond the downstream end of body 25 and sleeve 37 to enable wrench-flat or the like exposure to a suitable tool, whereby the cathode element 11 may be removably clamped to the cathode subassembly, without further disassembly of the parts of FIG. 3.

Figure 4:
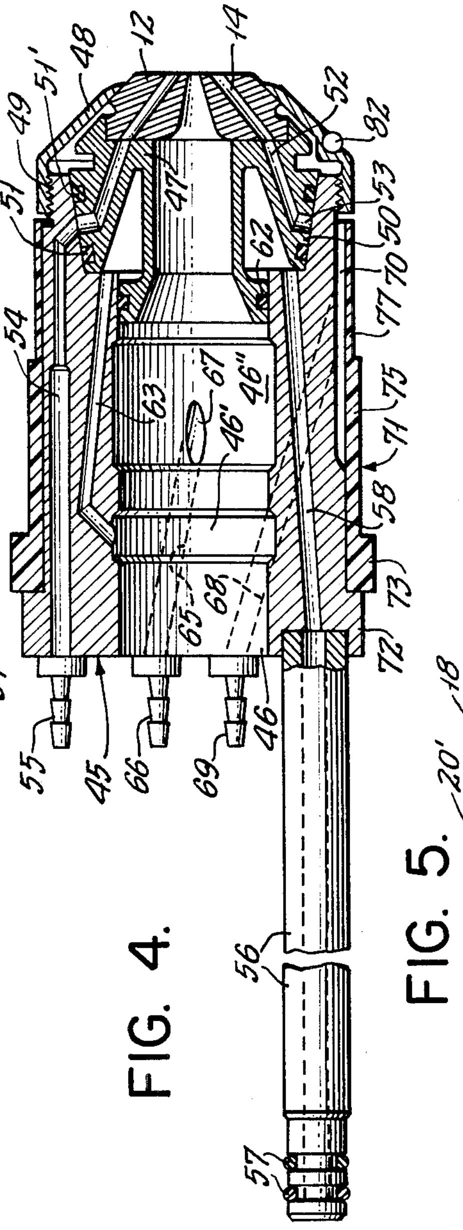

Referring now principally to FIGS. 1 and 4, the anode subassembly is seen to comprise an elongate annular body 45 having a bore 46 adapted to receive the sleeve 37 of the cathode subassembly, in circumferentially sealed engagement via the O-rings 40—40', being locally recessed at 46'—46'' for axial register with the external circumferential reductions of sleeve 37, at 42 and between O-rings 40—40'. An intermediate annular member 47 is removably seated in a counterbore at the downstream end of body 45 and, in turn, the anode element 12 is removably seated in a counterbore at the downstream end of intermediate member 47. The parts 47-12 are held in their subassembled relation by an annular clamp nut 48 having threaded engagement at 49 to the downstream end of body 45; and the convergent downstream end of nut 48 radially laps anode element 12, to compressionally retain the subassembled relation. When nut 48 is released, the parts 47-12 are rendered readily removable by reason of a divergent frusto-conical counterbore defining the fitted interface 50 between body 45 and intermediate member 47. Axially spaced annular grooves within this interface retain elastomeric O-rings 51—51' to assure sealed delivery of the carrier-gas flow (and its powder, fluidized therein) to the passages 14 in anode element 12, via registering angularly spaced passages 52 in member 47, an annular manifolding groove 53 between seals 51—51', and an elongate passage 54 through body 45, to an external-supply connection or fitting 55, for removable flexible-hose connection.

The anode body receives its electrical excitation and provides for coolant-flow external connection via an elongate tubular member 56, similar to the corresponding tubular cathode member 35, and in parallel but radially offset relation to the central axis of the torch, the offset being such as to align member 46 for passage through one of the bores 23 in base member 17, upon assembly of the anode subassembly thereto. Anode-supply member 56 is fitted with O-ring seals 57 at its upstream end and has permanent soldered fit to a suitable counterbore at the upstream end of an elongate coolant-supply passage 58 in body 45. At its downstream end, passage 58 opens to an annular anode-cooling cavity 59 which axially extends in intermediate member 47 toward but short of the anode element 12 and which is defined in part by an inner tubular projection 60, for plasma-gas enshrouding confinement, between collet 31 and anode element 12; at its upstream end, the projecting part 60 of intermediate member 47 is radially outwardly flanged at 61 and its circumferentially grooved to retain an elastomeric O-ring 62 for sealed removable fit to the body bore 46. The O-ring seals 51-62 thus establish spaced concentric limits of a sealed annulus in the fit of intermediate member 47 to body 45, and the coolant-supply passage 58 communicates with cavity 59 at one angular location within this sealed annulus; at preferably a diametrically opposite location within this sealed annulus, a further coolant-flow passage 63 in body 45 completes the circuit of coolant flow, to the point of communication with the manifolding recess 46', i.e., positioned for communication with the coolant passage of the cathode subassembly via ports 41, when the cathode and anode subassemblies are assembled to each other.

Description of the anode subassembly is completed by next identifying a plasma-gas supply passage 65 in body 45, from a hose-connection fitting 66 to a point of discharge at 67 into the manifolding recess 46''; in similar fashion, a shielding-gas supply passage 68 extends from another hose-connection fitting 69 to an elongate shielding-gas supply groove 70 which is open at its downstream end, in near-adjacency to threads 49. Finally, an elongate electrically insulating sleeve 71 having a cylindrical bore is fitted to a matching cylindrical land which externally characterized body 45 in the region between an upstream-end flange 72 and the downstream-end threads at 49. The external features of sleeve 71 are an upstream-end flange 73 (to fit a first counterbore 74 in coupling member 19), a first land 75 (to fit a second counterbore 76 in coupling member 19), and a second land 77 (to fit the remainder 78 of the bore of coupling member 19). It will be noted that sleeve 71 converts groove 70 into a shielding-gas supply passage and that the downstream end of sleeve 71 terminates in axially spaced relation to nut 48, thereby enabling this axial space (identified 79 in FIG. 1) to serve an annular manifolding function when the nose-clamp element is secured.

Figure 5:
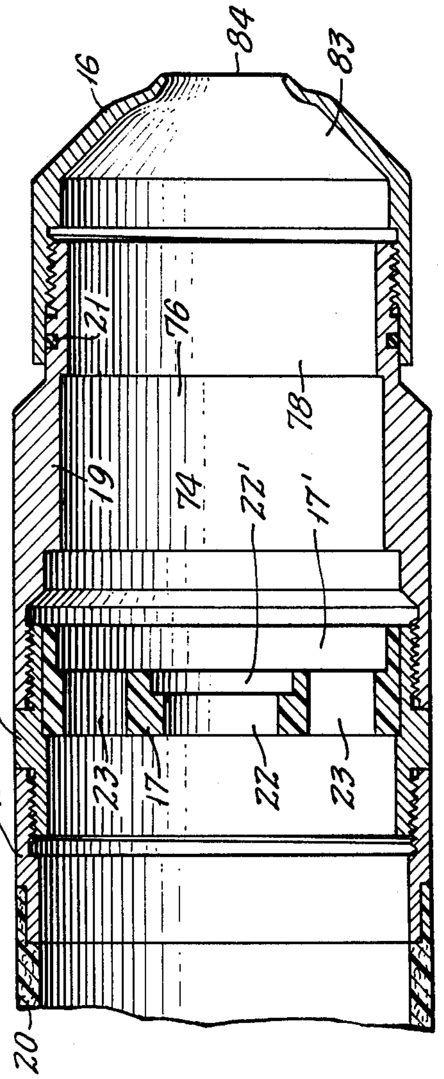
Figure 2:
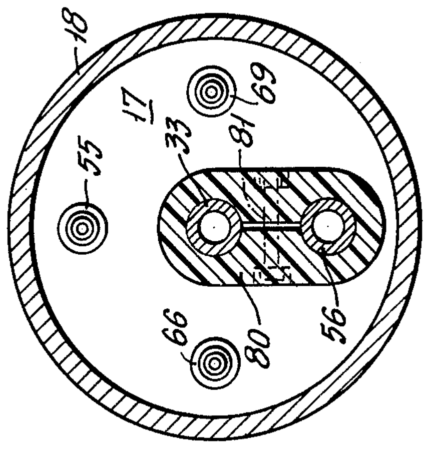
FIG. 2 is a transverse section taken at 2—2 of FIG. 1.

Having thus identified components of the subassemblies of FIGS. 3, 4 and 5, their mutual assembly will be described. First, with the nipple 18 unthreaded from connection with either coupling 19 or sleeve 20, and with base 17 either alone or preassembled to the counterbore of nipple 18, the tail 35–32 of the cathode subassembly of FIG. 3 may be inserted through the central opening 22, with the exposed part of nut 39 entering the counterbore 22′ of bore 22, until sleeve 37 abuts the surrounding flat radial-plane surface of base 17. Then, the anode subassembly (FIG. 4) may be assembled over the downstream end of the cathode subassembly, while orienting tail 56 of the anode assembly to pass through one of the base openings 23. When thus assembled, the coolant passage 63 in the anode body 45 will be in axial register with the annular manifold at 46′ between O-rings 40—40′; the plasma-gas supply passage 65 will discharge at opening 67, in axial register with the annular manifold 42–46″ in the interface with cathode sleeve 37; and the shielding-gas supply passage 68 will discharge into the passage defined by body groove 70 and the bore of sleeve 71. It will be noted that the total carrier-gas supply is complete within the anode subassembly, and that all remaining coolant-circuit passages to and including cavity 59 are also complete within the anode subassembly. It will be appreciated that for purposes of showing and identifying all hose fittings 55-66-69 for the respective gas flows, they are only schematically located, it being understood that their angular spacing is such as to independently pass through different remaining bores 23 in base 17, as better shown in the sectional view of FIG. 2.

The thus-far achieved assembly, whether performed as described or, optionally, by first assembling the FIG. 3 and FIG. 4 subassemblies to each other, will be characterized by reception of the upstream cylindrical end of anode body 45 in a concentric-locating counterbore 17′ in base 17, whereupon coupling 19 may be threadedly engaged to nipple 18, as sleeve flange 73 seats in the upstream counterbore 74 of the coupling. At this point, an electrically insulating clamp 80 having two parallel bores at the offset spacing of tail elements 32–35 and 56 is assembled over the ends of elements 32–35 and into abutment with the upstream face of base 17; as shown, clamp 80 is slotted between its bores and will be understood to be of sufficiently yieldable plastic, to permit adjustable means including a transverse bolt 81 through the slotted region to set the clamp 80, securely anchored to both the cathode and anode tail elements 32–35.

To complete an assembly of the torch 10, three identical electrically insulating balls 82 (FIG. 1), preferably of a ceramic such as alumina or zirconia, are assembled to identical angularly spaced ball-retaining sockets in the exposed convex frusto-conical surface of the anode-assembly nut 48. These balls 82 protrude beyond this convex surface and establish three equally spaced points of clamping contact with the concave (and correspondingly frusto-conical) surface 83 (FIG. 5) of the convergent part of nose-clamp member 16, when in threaded engagement with coupling 19. The nose clamp is set when clamp force (tensed via the threaded connection of nipple 18, coupling 19, and nose clamp nut 16) compresses cathode sleeve 37 into its seat at base counterbore 22′, via balls 82, nut 48, anode element 12, intermediate member 47 (at its flange 61); whereupon the convergent shielding-gas passage is established between parts 16–48. Of course, the protective sleeve 20 is only finally assembled to nipple 18 when electrical connection is made to the tail elements 35–36 of the electrodes and after all hose connections have been made to fittings 55-66-69; these connections are then well protected by threaded connection of sleeve 20 to nipple 18.

It will be seen that the described torch structure meets all stated objects. All independent flows are provided in and by coacting subassemblies which are immediately accessible for inspection, service and/or replacement, upon release of the noseclamp nut 16. Such release exposes the anode-retaining nut 48, which may also be readily disengaged. Preferably, matched spacer balls 82 of a given size are in staked or swaged permanent assembly to any given anode-retaining nut 48, there being a series of such nuts 48 available for any given torch 10, and each nut in the series being equipped with matched balls 82 of different size, so that by selection of a given nut 48 from the series, one may establish an annular shielding-gas passage 15 and its associated discharge opening, of selected effective thickness. When nut 48 is removed, the anode element 12 and the intermediate member 47 are easily extracted, for inspection and/or replacement, and wrench access is immediately available for collet actuation and cathode-element replacement, if inspection should indicate the need.

The electrically conductive parts 35-25-39-31 of the cathode subassembly are conveniently of brass, and for durability a tungsten cathode element 11 is recommended. Electrically conductive parts 56-45-48 of the anode subassembly are also conveniently of brass, the anode elements 12–47 being preferably of copper. With the exception of the ceramic spacer balls 82 and the protective sleeve 20, all electrically insulating parts, such as sleeves 37–71 and clamp 80 may be of Delrin or Teflon; the protective sleeve 20 is suitably of epoxy with glass-fiber filling, preferably with molded attachment to an internally threaded brass ring 20′, where removably secured to nipple 18, as suggested in FIG. 5. In spite of the electrical potentials and flows including coolant liquid (preferably distilled water, recirculating via an external heat exchanger), the insulating arrangement is such that all externally exposed metal parts, as at 18-19-16, are electrically neutral and may be grounded by means not shown, to avoid development of an electro-static charge. The preferred forwardly extending lip 84 of the nose-clamp nut 16 projects beyond the anode element 12 and, being electrically neutral, prevents inadvertent direct contact of anode element 12 with a workpiece.

While the invention has been described in detail for the preferrred form shown, it will be understood that modifications may be made within the claimed scope of the invention.

For example, in addition to an ability to select the gap size for shielding-gas glow and discharge (through selecting a clamp nut 48 with balls 82 of predetermined size), it will be understood that the clamp element 16 may be a selected one of a series wherein variously contoured internal surfaces may determine shielding-gas flow most appropriate to a particular application or use of the torch.

What is claimed is:

1. A plasma-transferred-arc torch construction comprising an elongate central cathode subassembly having a downstream-directed cathode-discharge end and a radial mounting shoulder at an upstream mounting region thereof, an elongate insulating sleeve forming part of said subassembly downstream from said shoulder; a tubular mounting subassembly including a radially extending base of insulating material at said region and having a central bore through which the upstream end of said cathode assembly extends, with said shoulder in axial reference to said base; and an annular anode subassembly adapted for axial reference to said base via said sleeve and having a bore removably supported by said sleeve, said anode subassembly being convergent at its downstream end for axially overlapped radially spaced coaction with said cathode-discharge end; said tubular mounting subassembly including elongate outer tubular structure fully surrounding said cathode and anode subassemblies and having a convergent annular downstream end overlapping but in spaced relation to the convergent end of said anode subassembly, said outer tubular structure having axially adjustable threaded reference to said base, and angularly spaced insulating spacer elements of limited angular extent in the space between said convergent ends and adapted for insulated compressional loading upon threaded adjustment of said outer tubular structure to retain the base reference of both said cathode and anode subassemblies, and said anode subassembly including shielding-gas supply-passage means communicating with the convergent space between said convergent ends, whereby said convergent space serves both as a manifold for shielding-gas flow and as a convergent nozzle for discharge of shielding gas around an externally transferred arc discharge downstream from and between said cathode and anode subassemblies.

2. The construction of claim 1, in which said spacer elements comprise three equally spaced balls.

3. The construction of claim 2, in which said balls are of high dielectric strength ceramic.

4. The construction of claim 1, in which said anode subassembly includes a radially outward shoulder formation near the upstream mounting region thereof, and a radially outwardly shouldered insulating sleeve in axial abutment with said shoulder formation; and in which said outer tubular structure has a radially inward shoulder defined by an upstream directed counterbore, said radially inward shoulder compressionally loading said anode-subassembly shoulder via said sleeve shoulder upon threaded adjustment of said outer tubular structure.

5. The construction of claim 4, in which said outer tubular structure comprises a first tubular member having said radially inward shoulder and having adjustably threaded reference to said base, and a second tubular member having said convergent annular downstream end and adjustably threaded reference to said first tubular member.

6. The construction of claim 1, in which said anode subassembly comprises an elongate first annular body part having said bore and removably supported by said sleeve, and means separably connected to said first body part and including a second annular body part having said convergent downstream end, said separably connected means comprising means including a downstream-divergent counterbore in the downstream end of said first body part and establishing a frustoconical interface in the positioning of said first and second body parts.

7. The construction of claim 6, in which said interface is characterized by axially spaced circumferential grooves with O-ring seals therein, and powder-supply passage means including a first-body-part passage and a second-body-part passage communicating with each other via the interface space between said spaced O-ring seals, said second-body-part passage having a downstream-directed discharge end.

8. The construction of claim 6, in which said second-body-part passage is one of an angularly spaced plurality thereof, said interface being characterized by a circumferentially continuous annular manifolding groove with which all passages of said plurality communicate.

9. The construction of claim 6, in which said anode subassembly further comprises a third annular body part axially interposed between said first and second body parts, said third body part having a convex frustoconical upstream-end formation with removable fit to said counterbore and a counterbored downstream-end formation to which said third body part has a removably fitted relation.

10. The construction of claim 9, in which said anode subassembly further comprises a nut element having threaded-engagement to the downstream end of said first body part and having a convergent annular flange formation in radially lapped engagement with said second body part, whereby a subassembled relation of said first, second and third body parts may be detachably retained via said nut element.

11. The construction of claim 9, in which said third body part has a first circumferentially continuous O-ring sealed relationship to the bore of said first body part and a second circumferentially continuous O-ring sealed relationship at said interface and an annular anode-coolant cavity open to said first body part in the space between said O-ring sealed relationships, and coolant supply-passage means including two angularly offset passages in said first body part and respectively having independent communication with said cavity via angularly spaced locations in the space between said O-ring sealed relationships.

12. The construction of claim 11, in which the upstream end of said cathode subassembly includes an elongate tubular conductive cathode connection traversing the central bore of said base; in which the upstream end of said anode subassembly includes an elongate tubular conductive anode connection traversing an opening in said base at radial offset from said central bore; one of said angularly offset passages in said first body part having sealed communication with the bore of said cathode connection, and the other of said angularly offset passages in said first body part having sealed communication with the bore of said anode connection.

13. The construction of claim 1, in which said cathode subassembly includes a replaceable cathode element having a cylindrical upstream end, and collet means for releasably mounting said cathode element as the downstream-projecting end of said cathode subassembly.

14. The construction of claim 13, in which in the region of said collet means said elongate insulating sleeve extends in downstream directed axial overlap, said last-mentioned region of said cathode subassembly being in relieved radial offset from the bore of said insulating sleeve to define a circumferentially continuous annular gas-manifolding zone in communication with the spaced downstream-end region of cathode-discharge coaction with said anode subassembly, and plasma-gas supply-passage means including a passage in said anode subassembly communicating with said gas-manifolding zone via a radial opening in said insulating sleeve.

15. The construction of claim 14, in which at interface of said insulating sleeve with the bore of said anode subassembly one of said anode and cathode subassemblies has a circumferentially continuous manifolding groove establishing communication between the plasma-gas supply passage of said anode subassembly and the radial opening in said insulating sleeve, said radial opening being one of an angularly spaced plurality at substantially the same axial location.

16. The construction of claim 12, in which the passage connection to the bore of said cathode connection is via a radial opening in said insulating sleeve, a first pair of axially-spaced O-ring seals on opposite axial sides of said radial opening and at the radially outer interface between said insulating sleeve and said anode subassembly, and a second pair of axially-spaced O-ring seals on opposite sides of said radial opening and at the radially inner interface between said insulating sleeve and the adjacent remaining portion of said cathode subassembly.

17. The construction of claim 16, in which at least one of the surfaces at each of said interfaces includes a circumferentially continuous manifolding groove in communication with said radial opening, said radial opening being one of an angularly spaced plurality at substantially the same axial location.

18. The construction of claim 12, in which an insulating clamp radially spans and clamps said anode connection and said cathode connection to each other on the upstream side of said base.

19. The construction of claim 1, in which the bore of said insulating sleeve has a counterbore of limited axial extent at its downstream and upstream ends, thereby defining a bore of reduced diameter between said counterbores, said cathode subassembly including a radially outward flange formation seated in one of said counterbores and a nut threadedly engaged to the local remaining region of the remainder of said cathode subassembly and releasably seated in the other of said counterbores.

20. A plasma-transferred-arc torch construction comprising an elongate central cathode having a downstream-directed cathode-discharge end, an annular anode surrounding said cathode, and a tubular mount surrounding said anode, insulating means retaining said cathode and anode and mount in concentric and radially spaced relation, said anode being convergent at its downstream end for axially overlapped radially spaced coaction with said cathode-discharge end, said tubular mount comprising upstream and downstream tubular parts in removable threaded engagement, the downstream one of said parts having a convergent annular downstream end overlapping but in spaced relation to the convergent end of said anode, said insulating means including a base to which said cathode and anode are axially referenced against displacement in the upstream direction and to which the upstream part of said mount is axially referenced against displacement in the downstream direction, and angularly spaced insulating spacer elements of limited angular extent in the space between said convergent ends and adapted for insulated compressional loading of the convergent end of said mount on the convergent end of said anode upon threaded adjustment of said upstream and downstream parts, the space between said anode and cathode being adapted to receive a flow of plasma gas for downstream discharge therebetween, and the space between said anode and mount being adapted to receive a flow of shielding gas for downstream discharge around the discharge or plasma gas.

21. The torch construction of claim 20, in which said spacer elements comprise three equally spaced balls of high dielectric strength ceramic.

* * * * *